United States Patent
Hara et al.

(10) Patent No.: US 11,974,030 B2
(45) Date of Patent: Apr. 30, 2024

(54) IMAGING APPARATUS AND CONTROL METHOD THEREFOR

(71) Applicant: SONY GROUP CORPORATION, Tokyo (JP)

(72) Inventors: Yuki Hara, Tokyo (JP); Yuya Yamazaki, Tokyo (JP); Hideo Kawataki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 173 days.

(21) Appl. No.: 17/604,575

(22) PCT Filed: Jan. 10, 2020

(86) PCT No.: PCT/JP2020/000559
§ 371 (c)(1),
(2) Date: Oct. 18, 2021

(87) PCT Pub. No.: WO2020/217599
PCT Pub. Date: Oct. 29, 2020

(65) Prior Publication Data
US 2022/0201176 A1 Jun. 23, 2022

(30) Foreign Application Priority Data
Apr. 26, 2019 (JP) .................. 2019-084828

(51) Int. Cl.
*H04N 23/52* (2023.01)
*G06F 1/20* (2006.01)

(52) U.S. Cl.
CPC .............. *H04N 23/52* (2023.01); *G06F 1/206* (2013.01)

(58) Field of Classification Search
CPC .......... H04N 23/52; H04N 23/60; H04N 5/77; G06F 1/20; G06F 1/206
See application file for complete search history.

(56) References Cited

U.S. PATENT DOCUMENTS

| 2009/0002549 A1* | 1/2009 | Kobayashi | ............. H04N 23/52 348/374 |
| 2015/0054961 A1* | 2/2015 | Saitoh | .................... H04N 23/11 348/164 |

(Continued)

FOREIGN PATENT DOCUMENTS

| JP | 2004-248059 A | 9/2004 |
| JP | 2012-108517 A | 6/2012 |

(Continued)

OTHER PUBLICATIONS

International Search Report and Written Opinion of PCT Application No. PCT/JP2020/000559, dated Mar. 24, 2020, 09 pages of ISRWO.

*Primary Examiner* — Kelly L Jerabek
(74) *Attorney, Agent, or Firm* — CHIP LAW GROUP

(57) ABSTRACT

To suppress a temperature rise in an imaging apparatus without giving an unnatural impression to the user. An imaging device generates imaging data. A data buffer stores the imaging data. An image processing unit performs image processing on the imaging data using the data buffer. A storage control unit causes a storage unit to store the processed imaging data. A temperature monitoring unit monitors temperatures of a plurality of different locations in the imaging apparatus. A speed control unit controls a storage speed in the storage unit on the basis of the temperatures.

10 Claims, 8 Drawing Sheets

(56) References Cited

U.S. PATENT DOCUMENTS

2019/0339881 A1* 11/2019 Scott, III ............... G06F 3/0679
2020/0053263 A1* 2/2020 Suenaga ................ H04N 5/915

FOREIGN PATENT DOCUMENTS

| JP | 2014-126891 A | 7/2014 |
| JP | 2017-005323 A | 1/2017 |
| JP | 2017120181 A | 7/2017 |
| WO | 2018/088518 A1 | 5/2018 |

* cited by examiner

Fig. 3

| RECORDING SPEED | TEMPERATURE CONDITION | | | | | |
|---|---|---|---|---|---|---|
| | MEMORY CARD | PROCESSOR | IMAGING DEVICE | DATA BUFFER | HOUSING METAL PORTION | HOUSING RESIN PORTION |
| NO LIMITATION (600MB/s) | <75°C | <80°C | <65°C | <80°C | <55°C | <60°C |
| WITH LIMITATION (300MB/s) | ≥75°C | ≥80°C | ≥65°C | ≥80°C | ≥55°C | ≥60°C |

Fig. 5

| RECORDING SPEED | TEMPERATURE CONDITION | | | | | |
|---|---|---|---|---|---|---|
| | MEMORY CARD | PROCESSOR | IMAGING DEVICE | DATA BUFFER | HOUSING METAL PORTION | HOUSING RESIN PORTION |
| WITHOUT LIMITATION (600MB/s) | <75°C | <80°C | <65°C | <80°C | <55°C | <60°C |
| FIRST LIMITATION (300MB/s) | ≥75°C <80°C | ≥80°C <90°C | ≥65°C <70°C | ≥80°C <83°C | ≥55°C <60°C | ≥60°C <65°C |
| SECOND LIMITATION (150MB/s) | ≥80°C | ≥90°C | ≥70°C | ≥83°C | ≥60°C | ≥65°C |

IMAGING APPARATUS AND CONTROL METHOD THEREFOR

CROSS REFERENCE TO RELATED APPLICATIONS

This application is a U.S. National Phase of International Patent Application No. PCT/JP2020/000559 filed on Jan. 10, 2020, which claims priority benefit of Japanese Patent Application No. JP 2019-084828 filed in the Japan Patent Office on Apr. 26, 2019. Each of the above-referenced applications is hereby incorporated herein by reference in its entirety.

TECHNICAL FIELD

The present technology relates to an imaging apparatus. More specifically, the present technology relates to an imaging apparatus that performs control based on temperature monitoring and a control method thereof.

BACKGROUND ART

With increase in the speed of imaging devices, processors, and recording media, the continuous shooting performance of still images in imaging apparatuses is improved. The higher the speed of signal processing by these components, the more heat is generated by each electric component. Therefore, for example, in order to prevent the temperature of the recording medium from rising during copying images between recording media, an imaging apparatus that detects the temperature of a recording medium and limits the recording speed has been proposed (see, for example, PTL 1). Further, a technique of monitoring a heat radiating portion of a processor and lowering the operating frequency of the processor according to the temperature is generally called thermal throttling (see, for example, PTL 2).

CITATION LIST

Patent Literature

[PTL 1]
JP 2017-005323 A
[PTL 2]
JP 2014-126891 A

SUMMARY

Technical Problem

In the above-mentioned conventional techniques, the temperature rise is suppressed by detecting heat generation and limiting the function of the portion where heat is generated. However, if only the operation of the portion where heat is generated is limited in the imaging apparatus, the performance limitation patterns become enormous, and the control may become complex. Further, if the operation of the imaging apparatus is suddenly stopped, the operability may be impaired and the user may be given an unnatural impression.

The present technology has been made in view of the above-described problems and an object thereof is to suppress a temperature rise in an imaging apparatus without giving an unnatural impression to the user.

Solution to Problem

The present technology has been made to solve the above-mentioned problems, and a first aspect thereof provides an imaging apparatus and a control method therefor, the imaging apparatus including an imaging device that generates imaging data; a data buffer that stores the imaging data; an image processing unit that performs image processing on the imaging data using the data buffer; a storage control unit that causes a storage unit to store the processed imaging data; a temperature monitoring unit that monitors temperatures of a plurality of different locations in the imaging apparatus; and a speed control unit that controls a storage speed in the storage unit on the basis of the temperatures. This has an effect that the storage rate in the storage unit is controlled on the basis of the monitored temperatures of the plurality of locations.

In the first aspect, the imaging apparatus may further include: a plurality of temperature sensors that measures a plurality of temperatures of any one of the imaging device, the data buffer, the image processing unit, the storage unit, and a housing of the imaging apparatus, and the temperature monitoring unit may monitor the temperatures measured by the plurality of temperature sensors. This has an effect that the storage speed in the storage unit is controlled on the basis of the temperatures measured by the plurality of temperature sensors.

In the first aspect, the speed control unit may control the storage speed in the storage unit by controlling the data transfer speed to the storage unit. This has an effect that the storage speed in the storage unit is directly controlled.

In the first aspect, the speed control unit may control the storage speed in the storage unit by controlling an operating speed of at least one of the imaging device, the image processing unit, and the data buffer. This has an effect that the storage speed in the storage unit is indirectly controlled.

In the first aspect, the temperature monitoring unit may set independent temperature conditions for the plurality of locations to perform monitoring, and the speed control unit may reduce the storage speed in the storage unit when the temperature monitoring unit detects a temperature higher than the temperature condition in at least one of the plurality of locations. This has an effect that the temperature is monitored according to independent temperature conditions for the plurality of locations and the storage speed in the storage unit is controlled.

In the first aspect, the temperature monitoring unit may set the temperature condition in a plurality of steps according to the temperature, and the speed control unit may reduce the storage speed in the storage unit according to the temperature condition of a location showing a temperature in a strictest step among the plurality of locations. This has an effect that the storage speed in the storage unit is controlled in a stepwise manner according to the temperature conditions set in a plurality of steps.

In the first aspect, the speed control unit may further perform control on an operating speed of a portion showing a temperature in the strictest step of the temperature conditions among the imaging device, the data buffer, the image processing unit, the storage unit, and the housing of the imaging apparatus. This has an effect that the operating speed at the heat generating portion is controlled in addition to controlling the storage speed in the storage unit.

In the first aspect, the temperature monitoring unit may set the temperature condition of the housing of the imaging apparatus to be stricter than that of locations other than the housing. This has an effect that the housing that the user directly touches is controlled so that the user does not feel uncomfortable.

In the first aspect, the temperature monitoring unit may set the temperature condition of the housing of the imaging apparatus separately for a metal portion and a resin portion, and may set the temperature condition of the metal portion to be stricter than the temperature condition of the resin portion. This has an effect that the metal portion having high thermal conductivity is controlled so that the user does not feel uncomfortable.

BRIEF DESCRIPTION OF DRAWINGS

FIG. 3 is a diagram illustrating an example of temperature conditions in the first embodiment of the present technology.

FIG. 5 is a diagram illustrating an example of temperature conditions in a second embodiment of the present technology.

DESCRIPTION OF EMBODIMENTS

Hereinafter, modes for carrying out the present technology (hereinafter referred to as embodiments) will be described. The description will be made in the following order.

1. First Embodiment (Example of controlling recording speed according to temperatures of plurality of locations)
2. Second Embodiment (Example of controlling recording speed according to plurality of steps of temperature conditions)
3. Third Embodiment (Example of indirectly controlling recording speed)
4. Fourth embodiment (Example of adding different control for each heat generation portion)

1. First Embodiment

Figure 1:
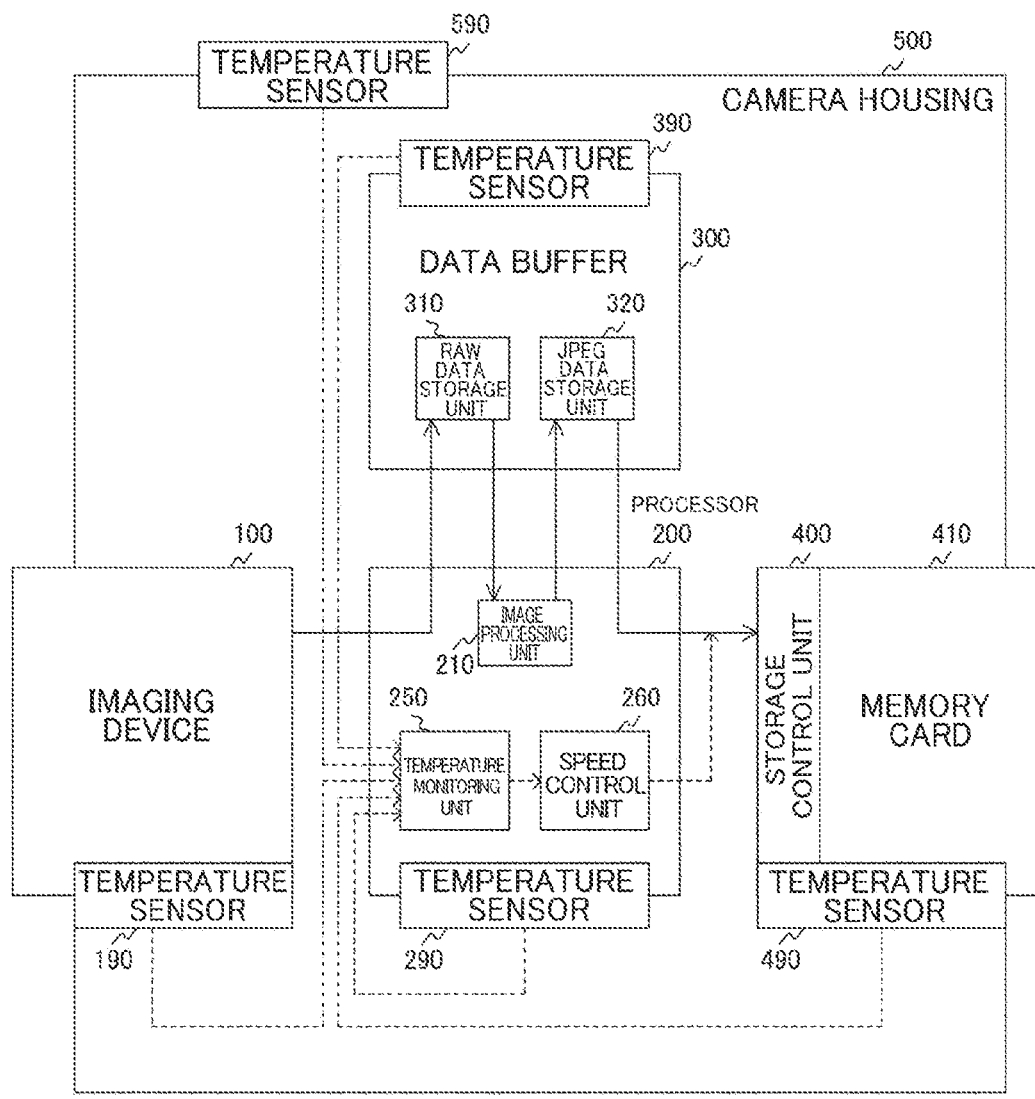
FIG. 1 is a diagram illustrating a configuration example of an imaging apparatus according to a first embodiment of the present technology.

[Configuration of Imaging Apparatus]
FIG. 1 is a diagram illustrating a configuration example of an imaging apparatus according to a first embodiment of the present technology.

This imaging apparatus includes an imaging device 100, a processor 200, a data buffer 300, and a storage control unit 400. Further, these components are housed in a camera housing 500 to form an imaging apparatus. Temperature sensors 190, 290, 390, 490 and 590 are provided in the imaging device 100, the processor 200, the data buffer 300, the storage control unit 400, and the camera housing 500, respectively, and the ambient temperature of each component is measured.

The imaging device 100 is an image sensor that photoelectrically converts light from a subject to generate imaging data. Here, raw data (RAW data) of the Bayer array is assumed as the imaging data. This RAW data is temporarily stored in the data buffer 300.

The processor 200 is a processor (CPU: Central Processing Unit) that controls the entire processing of the imaging apparatus. The processor 200 includes an image processing unit 210, a temperature monitoring unit 250, and a speed control unit 260.

The image processing unit 210 performs RAW development image processing such as demosaic processing on the RAW data stored in the data buffer 300 to generate, for example, data of the JPEG (Joint Photographic Experts Group) format. This JPEG data is temporarily stored in the data buffer 300. That is, the image processing unit 210 performs image processing on the RAW data using the data buffer 300.

The temperature monitoring unit 250 monitors the temperatures measured by the temperature sensors 190, 290, 390, 490 and 590. As will be described later, the temperature monitoring unit 250 sets independent temperature conditions for each unit and monitors whether the temperature conditions are met.

The speed control unit 260 controls the recording speed in the storage control unit 400 on the basis of the monitoring result by the temperature monitoring unit 250. The recording speed is limited by the speed control unit 260, for example, in accordance with the NVMe (Non-Volatile Memory Express) standards.

The data buffer 300 is a buffer including a RAW data storage unit 310 that stores the RAW data from the imaging device 100 and a JPEG data storage unit 320 that stores the JPEG data from the processor 200. The data buffer 300 is configured as, for example, a memory such as a DDR (Double-Data-Rate) SDRAM (Synchronous Dynamic Random Access Memory).

The storage control unit 400 is an interface that controls a storage unit such as a memory card 410. The memory card 410 is a storage medium that can be used by being inserted into an imaging apparatus, and is configured as, for example, a non-volatile memory such as a flash memory.

Figure 2:
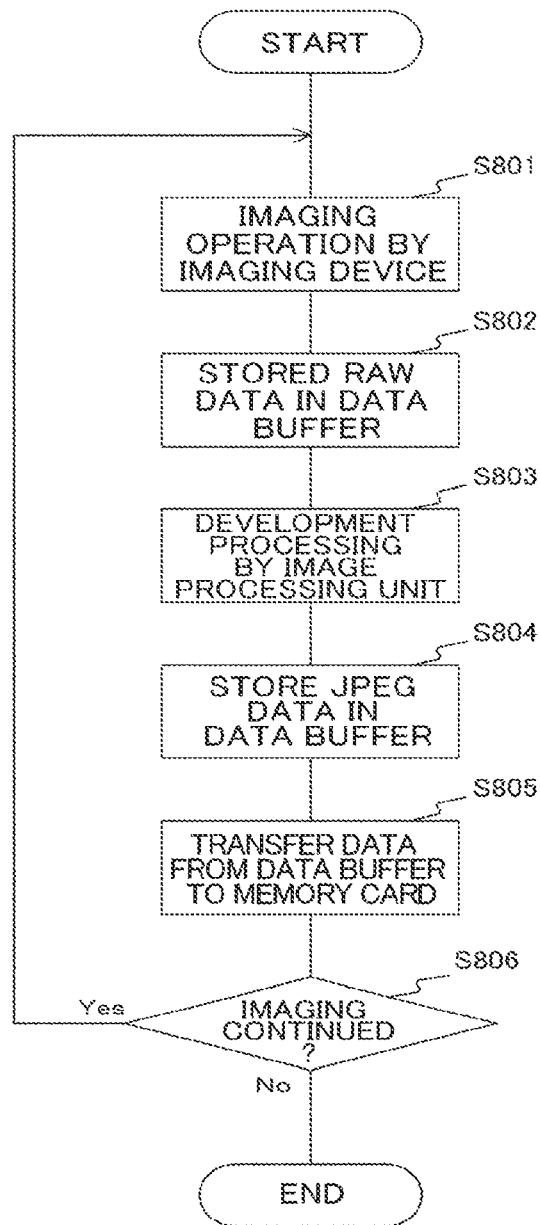
FIG. 2 is a flowchart illustrating an example of a processing procedure of an imaging process of an imaging apparatus according to the first embodiment of the present technology.

[Imaging Process]
FIG. 2 is a flowchart illustrating an example of a processing procedure of the imaging process of the imaging apparatus according to the first embodiment of the present technology.

When the imaging device 100 performs an imaging operation in response to pressing the shutter of the imaging apparatus or the like (step S801), the RAW data is stored in the RAW data storage unit 310 of the data buffer 300 (step S802).

The image processing unit 210 of the processor 200 performs RAW development image processing on the RAW data stored in the RAW data storage unit 310 (step S803), and stores the generated JPEG data in the JPEG data storage unit 320 of the data buffer 300 (step S804).

Then, under the control of the storage control unit 400, the JPEG data stored in the JPEG data storage unit 320 is stored in the memory card 410 (step S805). The recording speed at this time is controlled by the speed control unit 260.

When the imaging process is continued (step S806: Yes), the processes after step S801 are repeated. On the other hand, if the imaging process is not continued (step S806: No), the process ends.

[Temperature Conditions]

FIG. 3 is a diagram illustrating an example of temperature conditions in the first embodiment of the present technology.

In this example, independent temperature conditions are set for each of the temperature monitoring locations of the memory card 410 (storage control unit 400), the processor 200, the imaging device 100, the data buffer 300, and the camera housing 500. In particular, with respect to the camera housing 500, different temperature conditions are set for the metal portion and the resin portion. This is because heat is easily conducted in the metal portion and the properties are different from those in the resin portion.

When all of these temperature monitoring locations are below a threshold value, the recording speed on the memory card 410 is not particularly limited, and in this example, the speed is 600 Mbytes/sec. On the other hand, when the temperature exceeds the threshold value at any one of the locations, the recording speed on the memory card 410 is limited by the speed control unit 260, and in this example, the speed drops to 300 Mbytes/sec.

The followings should be considered when setting these temperature conditions.

The data buffer 300 and the memory card 410 are often specified to be used at 85° C. or lower because the data stored therein are likely to change in a high temperature environment. Therefore, it is necessary to set the threshold value to be less than 85° C.

The guaranteed temperature of the processor 200 is higher than that of the memory, but the higher the temperature, the higher the leakage power, and the heat generation tends to increase. Therefore, it is necessary to determine the threshold temperature of the performance limit in consideration of the leakage power.

For the imaging device 100, the performance-guaranteed temperature and the function-guaranteed temperature are often instructed. The function-guaranteed temperature is higher than the performance-guaranteed temperature. The performance-guaranteed temperature tends to be lower than the guaranteed temperature of other electronic devices because the concern about image quality increases when the temperature is exceeded. Therefore, among the electronic components used in the imaging apparatus, the device to be used tends to be determined with performance limitation applied from the state where the absolute temperature is the lowest.

The camera housing 500 needs to be limited to various safety standards and a temperature below which the user does not feel uncomfortable. In this example, a temperature lower than that of other portions is set as a threshold value. Further, since the metal portion has higher thermal conductivity than the resin portion, it is common to limit the temperature so that the temperature is lower than that of the resin portion.

[Speed Limiting Process]

Figure 4:
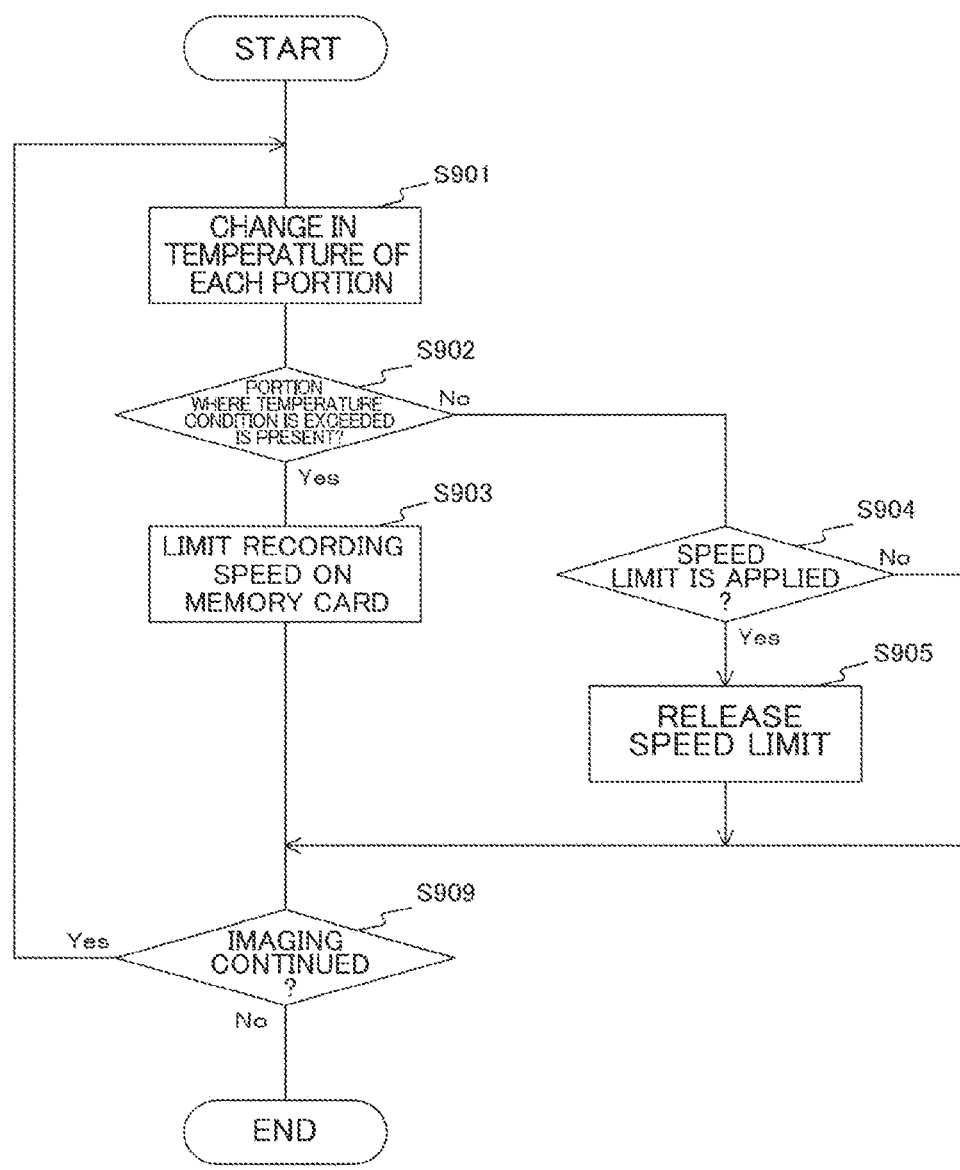
FIG. 4 is a flowchart illustrating an example of a processing procedure of a speed limiting process of the imaging apparatus according to the first embodiment of the present technology.

FIG. 4 is a flowchart illustrating an example of a processing procedure of a speed limiting process of the imaging apparatus according to the first embodiment of the present technology.

When the change in the temperature of each portion is measured by the temperature monitoring unit 250 (step S901), if there is even one portion where the temperature condition is exceeded (step S902: Yes), the recording speed on the memory card 410 is limited by the speed control unit 260 (step S903).

On the other hand, if there is no portion where the temperature condition is exceeded (step S902: No) and the speed limit has already been set (step S904: Yes), the speed limit is released (step S905).

When the imaging process is continued (step S909: Yes), the processes after step S901 are repeated. On the other hand, if the imaging process is not continued (step S909: No), the process ends.

[Advantageous Effects]

As described above, in the first embodiment of the present technology, the temperature monitoring unit 250 monitors the temperatures of a plurality of locations of the imaging apparatus, and the speed control unit 260 limits the recording speed on the memory card 410 on the basis of the monitoring results. As a result, the maximum heat generation amount of the entire imaging apparatus can be suppressed by simple control. Further, since the recording process on the memory card 410, which is a subsequent stage of the imaging process, is limited, it is considered that the influence on the image quality to be imaged and the continuous shooting speed is minimized, and it does not give an unnatural impression to the user. That is, heat generation can be suppressed in a well-balanced manner by limiting the performance rather than limiting the function.

In this embodiment, giving limitation in the subsequent stage of the imaging process is particularly effective in suppressing the temperature rise at a location where there is a time lag between the power consumption and the temperature rise. For example, in the camera housing 500, since there are thermal resistance and heat capacity on the heat path from a heat generation source, there is a time lag between power consumption and temperature rise. Therefore, with respect to such a location, the effect of suppressing the temperature rise by this embodiment can be particularly expected.

Further, in this embodiment, there is a time lag from the speed limit to the suppression of the temperature, and in this respect, it is particularly effective when there is no problem even if the temperature limit target value is temporarily exceeded. For example, in the imaging device 100, even if the performance-guaranteed temperature is exceeded, the function is guaranteed if the temperature is lower than the function-guaranteed temperature. Therefore, it is permissible that the temperature temporarily exceeds the performance-guaranteed temperature as a target value. Therefore, with respect to such a location, the effect of suppressing the temperature rise by this embodiment can be particularly expected.

2. Second Embodiment

In the above-described first embodiment, one threshold value is set for each portion as a temperature condition, but this temperature condition may be set in a plurality of steps. In this second embodiment, an example in which the temperature condition is set in a plurality of steps will be described. Since the configuration of the imaging apparatus is the same as that of the first embodiment described above, detailed description thereof will be omitted.

[Temperature Conditions]

FIG. 5 is a diagram illustrating an example of temperature conditions in the second embodiment of the present technology.

In this example, independent temperature conditions are set for the temperature monitoring locations of the data buffer 300 and the camera housing 500 in a plurality of steps.

When all of these temperature monitoring locations are below a threshold value of the first step, the recording speed on the memory card 410 is not particularly limited as in the first embodiment described above, and in this example, the speed is 600 Mbytes/sec.

Further, when the temperature exceeds the threshold value of the first step at any one of the locations, the recording speed on the memory card 410 is limited by the speed control unit 260, and in this example, the speed drops to 300 Mbytes/sec.

Further, when the temperature exceeds the threshold value of the second step at any one of the locations, the recording speed on the memory card 410 is limited by the speed control unit 260, and in this example, the speed drops to 150 Mbytes/sec.

For example, when the temperature of the processor 200 is 80° C. or higher and lower than 90° C., and the temperatures of the other portions are below the threshold value of the first step, the recording speed on the memory card 410 is 300 Mbytes/sec. When the temperature of the processor 200 becomes 90° C. or higher, the recording speed on the memory card 410 is 150 Mbytes/sec.

In this example, threshold values of two steps are used as the temperature conditions, but threshold values of three steps or more may be set. Further, the relationship between the temperature condition and the recording speed may be set in the form of a function such as a proportional relationship.

[Speed Limiting Process]

Figure 6:
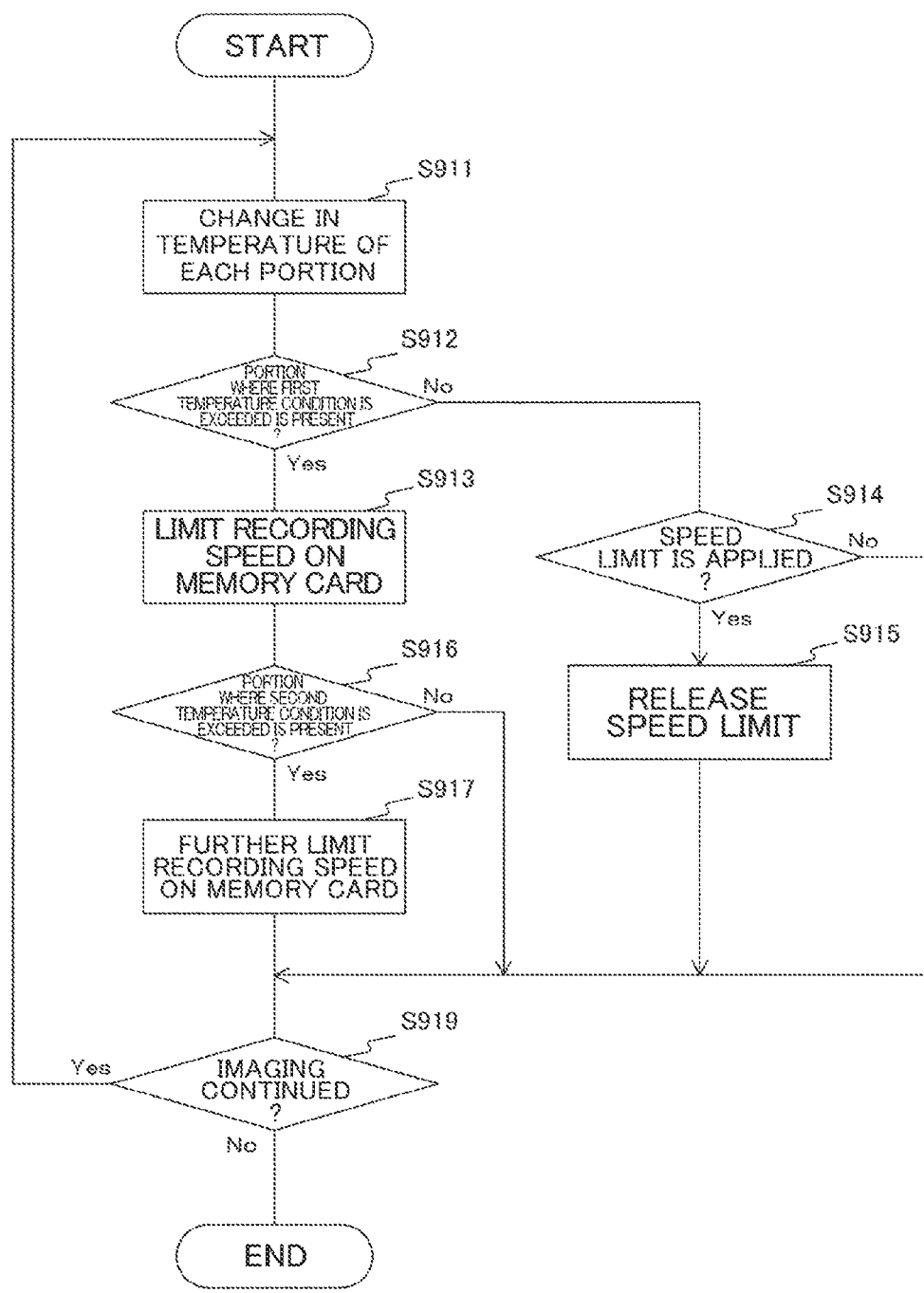
FIG. 6 is a flowchart illustrating an example of a processing procedure of a speed limiting process of the imaging apparatus according to the second embodiment of the present technology.

FIG. 6 is a flowchart illustrating an example of a processing procedure of a speed limiting process of the imaging apparatus according to the second embodiment of the present technology.

When the change in the temperature of each portion is measured by the temperature monitoring unit 250 (step S911), if there is even one portion where the first temperature condition is exceeded (step S912: Yes), the recording speed on the memory card 410 is limited by the speed control unit 260 (step S913).

Further, if there is even one portion where the second temperature condition is exceeded (step S916: Yes), the recording speed on the memory card 410 is further limited by the speed control unit 260 (step S917).

On the other hand, when there is no portion where the first temperature condition is exceeded (step S912: No), if the speed limit has already been set (step S914: Yes), the speed limit is released (step S915).

When the imaging process is continued (step S919: Yes), the processes after step S911 are repeated. On the other hand, if the imaging process is not continued (step S919: No), the process ends.

[Advantageous Effects]

As described above, according to the second embodiment of the present technology, since the recording speed on the memory card 410 is limited by the temperature conditions of a plurality of steps, the maximum heat generation amount of the entire imaging apparatus can be suppressed more finely.

3. Third Embodiment

In the first and second embodiments described above, an example in which the recording speed of the memory card 410 is directly controlled by the storage control unit 400 has been described, but the recording speed may be indirectly controlled by controlling other portions. In this third embodiment, an example in which the recording speed on the memory card 410 is indirectly controlled by controlling other portions will be described.

[Configuration of Imaging Apparatus]

Figure 7:
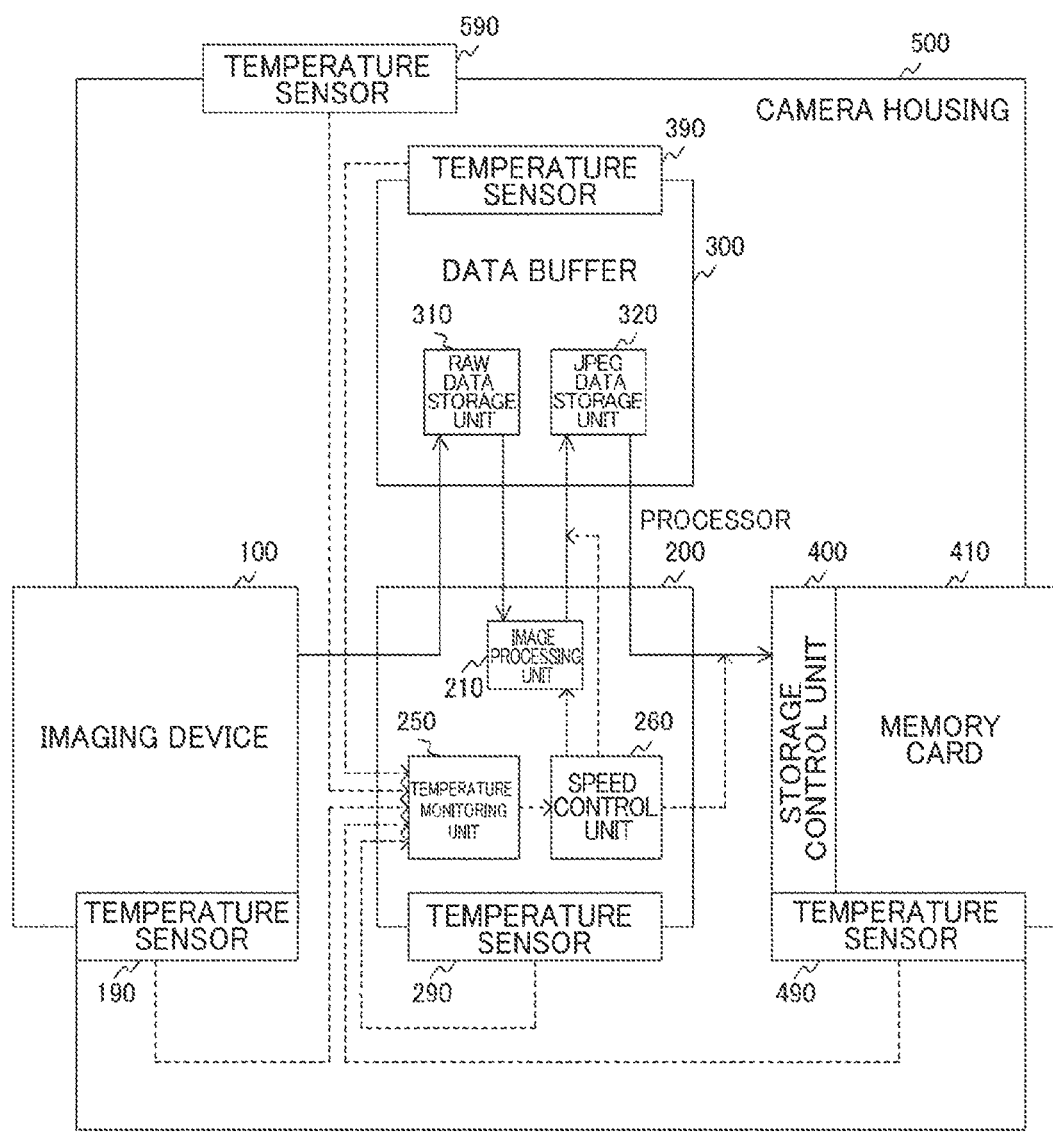
FIG. 7 is a diagram illustrating a configuration example of an imaging apparatus according to a third embodiment of the present technology.

FIG. 7 is a diagram illustrating a configuration example of an imaging apparatus according to a third embodiment of the present technology.

The imaging apparatus in the third embodiment is the same as the first embodiment except that the control target of the speed control unit 260 is different from that of the first embodiment.

The speed control unit 260 in the third embodiment indirectly controls the recording speed in the storage control unit 400 on the basis of the monitoring results by the temperature monitoring unit 250. For example, the speed control unit 260 may limit the speed of the image processing by the image processing unit 210. Further, the speed control unit 260 may limit the communication speed between the processor 200 and the data buffer 300. Further, two or more locations may be controlled at the same time.

This leads to a reduction in the amount of data for which the processing up to recording on the memory card 410 is completed in a unit time, and as a result, contributes to the power limitation.

[Advantageous Effects]

As described above, according to the third embodiment of the present technology, the maximum heat generation amount of the entire imaging apparatus can be suppressed by indirectly limiting the recording speed on the memory card 410.

4. Fourth Embodiment

In the first to third embodiments described above, only the recording speed on the memory card 410 is controlled, but control of the other portions may be used in combination. In this fourth embodiment, an example in which control of other portions is used in combination depending on the step of temperature conditions will be described. Since the configuration of the imaging apparatus is the same as that of the third embodiment described above, detailed description thereof will be omitted.

[Speed Limiting Process]

Figure 8:
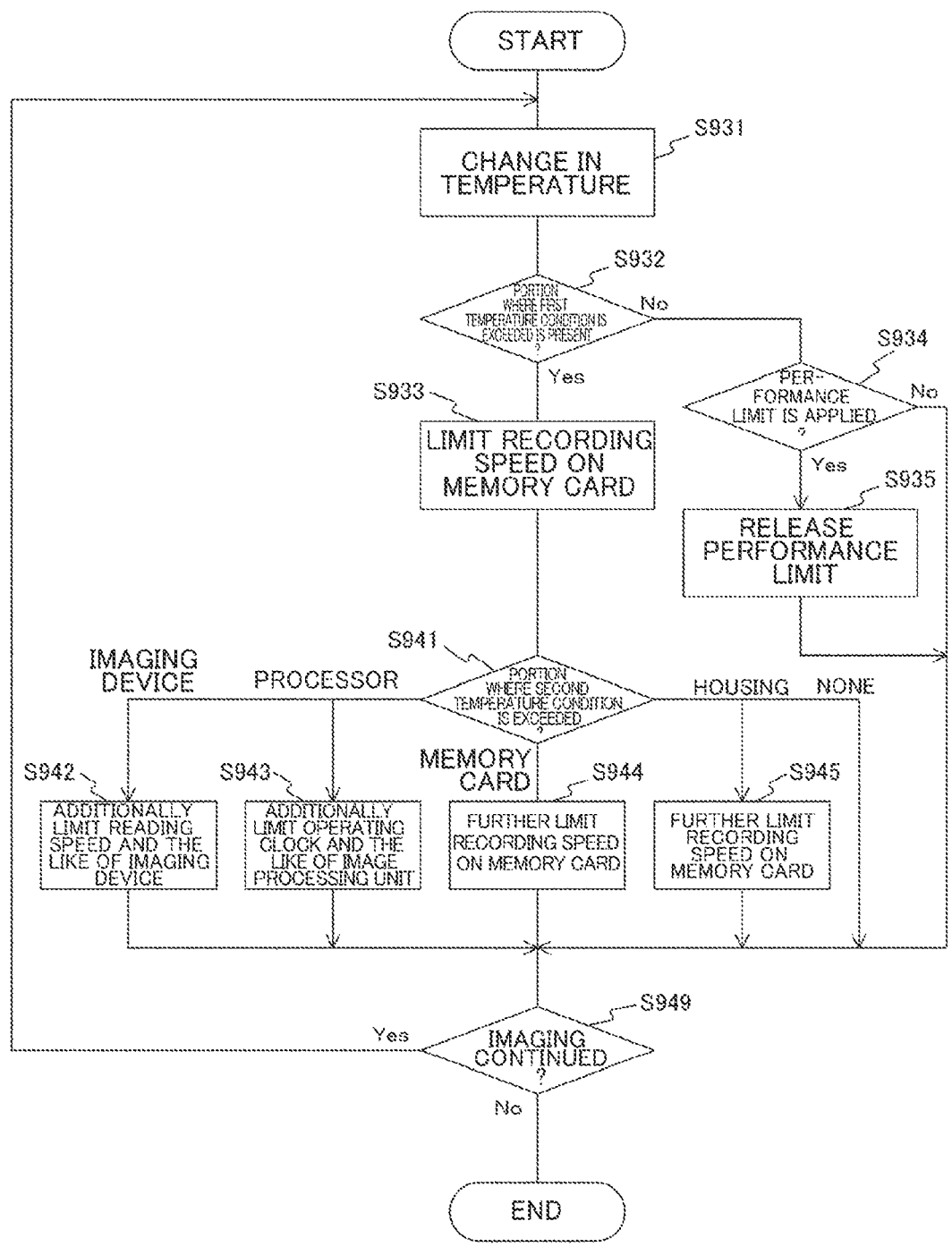
FIG. 8 is a flowchart illustrating an example of a processing procedure of a speed limiting process of an imaging apparatus according to a fourth embodiment of the present technology.

FIG. 8 is a flowchart illustrating an example of a processing procedure of a speed limiting process of the imaging apparatus according to the fourth embodiment of the present technology.

When the change in the temperature of each portion is measured by the temperature monitoring unit 250 (step S931), if there is even one portion where the first temperature condition is exceeded (step S932: Yes), the recording speed on the memory card 410 is limited by the speed control unit 260 (step S933).

Further, if there is even one portion where the second temperature condition is exceeded, processing is performed depending on the portion (step S941). That is, when the temperature of the imaging device 100 exceeds the second temperature condition, the reading speed of the imaging device 100 and the like are additionally limited (step S942). When the temperature of the processor 200 exceeds the second temperature condition, the operating clock of the image processing unit 210 of the processor 200 is additionally limited (step S943). Further, when the temperature of the memory card 410 exceeds the second temperature condition, the recording speed on the memory card 410 is further limited (step S944). However, when the temperature of the camera housing 500 exceeds the second temperature condition, since the camera housing 500 itself cannot be limited, the recording speed on the memory card 410 is further limited (step S945). If there is no portion where the second temperature condition is exceeded, these additional limitations are not applied.

On the other hand, when there is no portion where the first temperature condition is exceeded (step S932: No), if the speed limit has already been set (step S934: Yes), the speed limit is released (step S935).

When the imaging process is continued (step S949: Yes), the processes after step S931 are repeated. On the other hand, if the imaging process is not continued (step S949: No), the process ends.

Advantageous Effects

As described above, according to the fourth embodiment of the present technology, the temperature rise can be quickly suppressed by applying additional limitations to the portion where the second temperature condition is exceeded.

The embodiments described above each describe an example for embodying the present technology, and matters in the embodiments and matters specifying the invention in the claims have correspondence relationships. Similarly, the matters specifying the invention in the claims and the matters in the embodiments of the present technology denoted by the same names have correspondence relationships. However, the present technology is not limited to the embodiments, and can be embodied by subjecting the embodiments to various modifications without departing from the gist thereof.

The processing procedures described in the above embodiment may be considered as a method including a series of these procedures or may be considered as a program to cause a computer to execute a series of these procedures or a recording medium storing the program. As this recording medium, for example, a compact disc (CD), a minidisc (MD), a digital versatile disc (DVD), a memory card, or a Blu-ray (registered trademark) disc can be used.

The advantageous effects described in the specification are merely examples, and the effects of the present technology are not limited to them and may include other effects.

The present technology can also be configured as described below.

(1) An imaging apparatus including: an imaging device that generates imaging data; a data buffer that stores the imaging data; an image processing unit that performs image processing on the imaging data using the data buffer; a storage control unit that causes a storage unit to store the processed imaging data; a temperature monitoring unit that monitors temperatures of a plurality of different locations in the imaging apparatus; and a speed control unit that controls a storage speed in the storage unit on the basis of the temperatures.

(2) The imaging apparatus according to (1), further including: a plurality of temperature sensors that measures a plurality of temperatures of any one of the imaging device, the data buffer, the image processing unit, the storage unit, and a housing of the imaging apparatus, in which the temperature monitoring unit monitors the temperatures measured by the plurality of temperature sensors.

(3) The imaging apparatus according to (1) or (2), in which the speed control unit controls the storage speed in the storage unit by controlling the data transfer speed to the storage unit.

(4) The imaging apparatus according to (1) or (2), in which the speed control unit controls the storage speed in the storage unit by controlling an operating speed of at least one of the imaging device, the image processing unit, and the data buffer.

(5) The imaging apparatus according to any one of (1) to (4), in which the temperature monitoring unit sets independent temperature conditions for the plurality of locations to perform monitoring, and the speed control unit reduces the storage speed in the storage unit when the temperature monitoring unit detects a temperature higher than the temperature condition in at least one of the plurality of locations.

(6) The imaging apparatus according to (5), in which the temperature monitoring unit sets the temperature condition in a plurality of steps according to the temperature, and the speed control unit reduces the storage speed in the storage unit according to the temperature condition of a location showing a temperature in a strictest step among the plurality of locations.

(7) The imaging apparatus according to (6), in which the speed control unit further performs control on an operating speed of a portion showing a temperature in the strictest step of the temperature conditions among the imaging device, the data buffer, the image processing unit, the storage unit, and the housing of the imaging apparatus.

(8) The imaging apparatus according to (5), in which the temperature monitoring unit sets the temperature condition of the housing of the imaging apparatus to be stricter than that of locations other than the housing.

(9) The imaging apparatus according to (5) or (8), wherein the temperature monitoring unit sets the temperature condition of the housing of the imaging apparatus separately for a metal portion and a resin portion, and sets the temperature condition of the metal portion to be stricter than the temperature condition of the resin portion.

(10) A control method for an imaging apparatus including an imaging device that generates imaging data, a data buffer that stores the imaging data, an image processing unit that performs image processing on the imaging data using the data buffer, and a storage control unit that stores the processed imaging data in a storage unit, the method including: a procedure in which a temperature monitoring unit monitors temperatures of a plurality of different locations in the imaging apparatus; and a procedure in which a speed control unit controls a storage speed in the storage unit on the basis of the temperatures.

REFERENCE SIGNS LIST

100 Imaging device
190, 290, 390, 490 Temperature sensor
200 Processor
210 Image processing unit
250 Temperature monitoring unit
260 Speed control unit
300 Data buffer
310 RAW data storage unit
320 JPEG data storage unit
400 Storage control unit
410 Memory card
500 Camera housing

The invention claimed is:
1. An imaging apparatus, comprising:
an imaging device that is configured to generate imaging data;
a data buffer that is configured to store the imaging data;

an image processing unit that is configured to perform image processing on the imaging data using the data buffer;

a storage control unit that is configured to control a storage unit to store the processed imaging data;

a temperature monitoring unit that is configured to monitor a plurality of temperatures of a plurality of different locations in the imaging apparatus, wherein the plurality of different locations corresponds to at least one of the data buffer, the image processing unit, and the storage unit; and a speed control unit that is configured to control a storage speed in the storage unit based on the plurality of monitored temperatures.

2. The imaging apparatus according to claim 1, further comprising:

a plurality of temperature sensors that is configured to measure the plurality of temperatures of the imaging device, the data buffer, the image processing unit, the storage unit, and a housing of the imaging apparatus, wherein the temperature monitoring unit is configured to monitor the plurality of temperatures measured by the plurality of temperature sensors.

3. The imaging apparatus according to claim 1, wherein the speed control unit is configured to control the storage speed in the storage unit based on control of a data transfer speed to the storage unit.

4. The imaging apparatus according to claim 1, wherein the speed control unit is configured to control the storage speed in the storage unit based on control of an operating speed of at least one of the imaging device, the image processing unit, and the data buffer.

5. The imaging apparatus according to claim 1, wherein the temperature monitoring unit is configured to set independent temperature conditions for the plurality of different locations and monitor the plurality of temperatures based on the set independent temperature conditions, and the speed control unit is configured to reduce the storage speed in the storage unit based on a determination that the temperature monitoring unit detects a temperature higher than a temperature condition of the set independent temperature conditions in at least one of the plurality of different locations.

6. The imaging apparatus according to claim 5, wherein the temperature monitoring unit is configured to set the temperature condition in a plurality of steps according to the temperature, and the speed control unit is configured to reduce the storage speed in the storage unit according to the temperature condition of a location showing a temperature in a strictest step among the plurality of different locations.

7. The imaging apparatus according to claim 6, wherein the speed control unit is further configured to control on an operating speed of a portion showing the temperature in the strictest step of the set independent temperature conditions among the imaging device, the data buffer, the image processing unit, the storage unit, and a housing of the imaging apparatus.

8. The imaging apparatus according to claim 5, wherein the temperature monitoring unit is configured to set the temperature condition of a housing of the imaging apparatus to be stricter than that of locations other than the housing.

9. The imaging apparatus according to claim 5, wherein the temperature monitoring unit is configured to set the temperature condition of a housing of the imaging apparatus separately for a metal portion and a resin portion, and set the temperature condition of the metal portion to be stricter than the temperature condition of the resin portion.

10. A control method, comprising in an imaging apparatus:

generating, by an imaging device, imaging data;

storing by, a data buffer, the imaging data;

performing by, an image processing unit, image processing on the imaging data using the data buffer;

storing by, a storage control unit, the processed imaging data in a storage unit;

monitoring by, a temperature monitoring unit, a plurality of temperatures of a plurality of different locations in the imaging apparatus, wherein the plurality of different locations corresponds to at least one of the data buffer, the image processing unit, and the storage unit; and controlling by, aa speed control unit, a storage speed in the storage unit based on the plurality of monitored temperatures.

* * * * *